(12) United States Patent
Green

(10) Patent No.: US 7,695,236 B2
(45) Date of Patent: Apr. 13, 2010

(54) UTILITY VEHICLE

(76) Inventor: Kevin J. Green, 4419 Ricker Hwy., Blissfield, MI (US) 49228

( * ) Notice: Subject to any disclaimer, the term of this patent is extended or adjusted under 35 U.S.C. 154(b) by 320 days.

(21) Appl. No.: 11/062,511

(22) Filed: Feb. 22, 2005

(65) Prior Publication Data
US 2005/0196261 A1     Sep. 8, 2005

Related U.S. Application Data

(60) Provisional application No. 60/546,008, filed on Feb. 19, 2004.

(51) Int. Cl.
*B60P 5/00* (2006.01)
(52) U.S. Cl. ........................ 414/486; 187/237
(58) Field of Classification Search ............. 414/471, 414/486; 187/237, 232
See application file for complete search history.

(56) References Cited

U.S. PATENT DOCUMENTS

| | | | | |
|---|---|---|---|---|
| 3,452,887 A | * | 7/1969 | Larson et al. | 414/486 |
| 3,667,620 A | * | 6/1972 | Steiro | 414/680 |
| 3,912,092 A | * | 10/1975 | Bolton et al. | 414/486 |
| 4,119,222 A | * | 10/1978 | Kaarnametsa | 414/470 |
| 6,085,811 A | * | 7/2000 | Wiemeri et al. | 144/4.1 |
| 6,470,606 B1 | * | 10/2002 | Nagahiro et al. | 37/348 |
| 6,648,578 B1 | * | 11/2003 | Rouse | 414/482 |

* cited by examiner

*Primary Examiner*—Saúl J Rodríguez
*Assistant Examiner*—Joshua I Rudawitz
(74) *Attorney, Agent, or Firm*—Burgess Law Office, PLLC

(57) ABSTRACT

A versatile mobile utility cart or vehicle using either tracks, wheels or both for suspension and steering with propulsion coming from but not limited to an internal combustion engine or an electric motor. The vehicle is meant to be a utility workhorse with the ability to load and unload itself as well as drag or carry materials. The vehicle can be configured in many ways to do many tasks with the main feature being labor savings. One of the unique features of the vehicle is a loading system called a fork and foot system. For transport the forks and feet system can be raised or detached individually or as a system, this is beneficial when unloading. The foot may remain attached and used for stability. Detaching the fork and foot system as a system allows the vehicle to be used for other tasks including but not limited to: a dump vehicle; a skidder; a reel carrier; a fork lift/carrier; and a prime mover or base for brush chippers, stump cutters, tree spades and more.

18 Claims, 8 Drawing Sheets

UTILITY VEHICLE

CROSS-REFERENCE TO RELATED APPLICATIONS

This application claims the benefit of U.S. Provisional Application No. 60/546,008, filed Feb. 19, 2004.

BACKGROUND OF THE INVENTION

1. Field of the Invention

The present invention relates generally to a mobile utility vehicle for loading, transporting and unloading materials. In addition, the utility vehicle also includes a unique loading apparatus.

2. Description of Related Art

Utility vehicles such as handcarts, hand trucks, wheelbarrows and other devices have been used for many years as labor saving devices. These devices assist an individual or laborer in performing manual labor such as moving and transporting objects and workpieces. Further, they provide assistance when working in and around areas that cannot be easily reached by larger motor operated vehicles, particularly in areas too small or confined to allow the operation of such vehicles.

For instance, many landscape operations or landscapers cannot use large motor operated vehicles when working around homes or other structures, especially in developed areas where such vehicles will not fit or cannot be maneuvered due to the confines created by home density, fences and landscapes. Further, use of such large, motor operated vehicles may be prohibited due to the damage such vehicles would cause to the landscape. Accordingly, in these instances, much of the work requires manual labor to accomplish a variety of tasks including: landscape operations, planting trees, removing trees, laying sod, or other work that requires a significant amount of materials or objects to be moved physically or with the assistance of small non-powered or manually operated implements such as those set forth above.

Accordingly, there is a need for a powered utility vehicle of a size small enough to operate in confined spaces and in urban areas that minimizes damage to the property or landscape while providing sufficient lifting, loading, transporting and unloading properties. Specifically, it is advantageous that such a vehicle be operated by a single operator thereby reducing the amount of physical or manual labor needed to perform the job or task.

SUMMARY OF THE INVENTION

The present invention is a versatile mobile utility vehicle having a power source operative to power a propulsion system and, in an additional embodiment, the utility vehicle includes a loading apparatus or system.

The loading apparatus or system may include a unique foot and fork assembly that, once attached to the utility vehicle, provides an apparatus that can lift and load items in excess of the weight of the vehicle onto the vehicle.

The present invention further provides a utility vehicle of a size and design suitable to operate in confined or small spaces with a propulsion system that reduces damage to the ground surface or area in which the vehicle is operating. The vehicle has the ability to be operated by a single operator. Further, the present invention may include a lift and load apparatus attached to the utility vehicle wherein the utility vehicle has the ability to load and unload materials or items as well as being able to drag or carry these materials or items.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
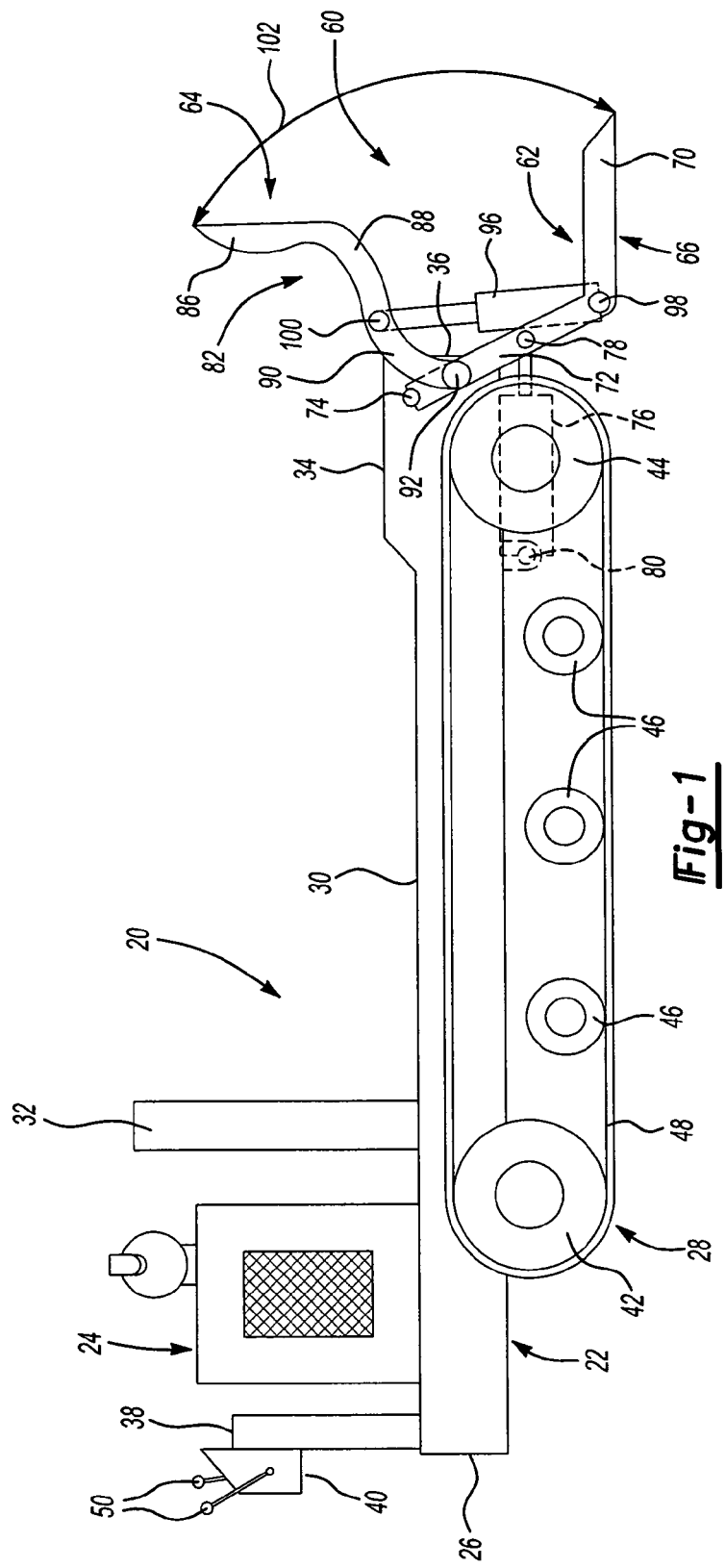
FIG. 1 is a side view of a utility vehicle according to one embodiment of the present invention having a track-type drive system and a loading apparatus.

Turning now to FIG. 1, a utility vehicle 20 is shown, according to one embodiment of the present invention. The utility vehicle 20 includes a vehicle frame, seen generally at 22. A power source 24, typically an internal combustion engine or an electric motor, is secured to the vehicle frame 22 near the rear end 26 of the vehicle frame 22. A propulsion system, seen generally at 28, is attached to the vehicle frame 22 and operates, upon receiving power through a drivetrain (not shown), to propel the utility vehicle 20.

A platform or bed 30 is attached to the upper surface of the vehicle frame 22. The bed or platform 30 forms a load-carrying surface of the utility vehicle 20. A first barrier member or wall 32 extends upwardly from the platform or bed 30 and forms a load-containing surface located adjacent the power source 24. As shown in FIG. 1, the platform or bed 30 may include a small upwardly extending raised portion or stop 34 located at the front end 36 of the utility vehicle 20 that helps to contain or hold a load on the utility vehicle 20 during operation.

A second barrier member or wall 38 is positioned near the rear end 26 of the utility vehicle 20 and provides both a protective barrier for the power source 24 and a mounting surface or frame member that supports a control mechanism, seen generally at 40, needed to operate the utility vehicle 20. Depending upon the various types of propulsion systems 28 used the control mechanism 40 for operating the drive or propulsion systems 28 may vary.

FIG. 1 illustrates one type of propulsion system 28 for use with the utility vehicle 20 according to one embodiment of the present invention. The propulsion system 28 includes a track-type drive arrangement having at least one drive wheel or sprocket 42, a tension or take up wheel or sprocket 44 and a plurality of either support wheels or sprockets 46. An endless belt or track 48 is positioned over the drive wheel or sprocket 42 and the tension or take up wheel or sprocket 44 in a known manner. Such track-type drive arrangements typically include a second track assembly positioned on the opposite side of the utility vehicle 20. Each track 48 is capable of being driven independent of the other in a known manner in order to steer the utility vehicle 20. In one embodiment of such a track-type drive arrangement, independent or separate hydraulic motors (not shown) are attached to and drive each track 48. The hydraulic motor receives hydraulic pressure from a pump attached to the power source 24. Each hydraulic motor is used to drive or rotate the drive wheel or sprocket 42 of the track assembly. A set of control handles or levers 50 are part of the control mechanism 40. Each handle or lever 50 connects to and provides input to the hydraulic motor to control the speed and direction of the motors and correspondingly each track 48.

Figure 4:
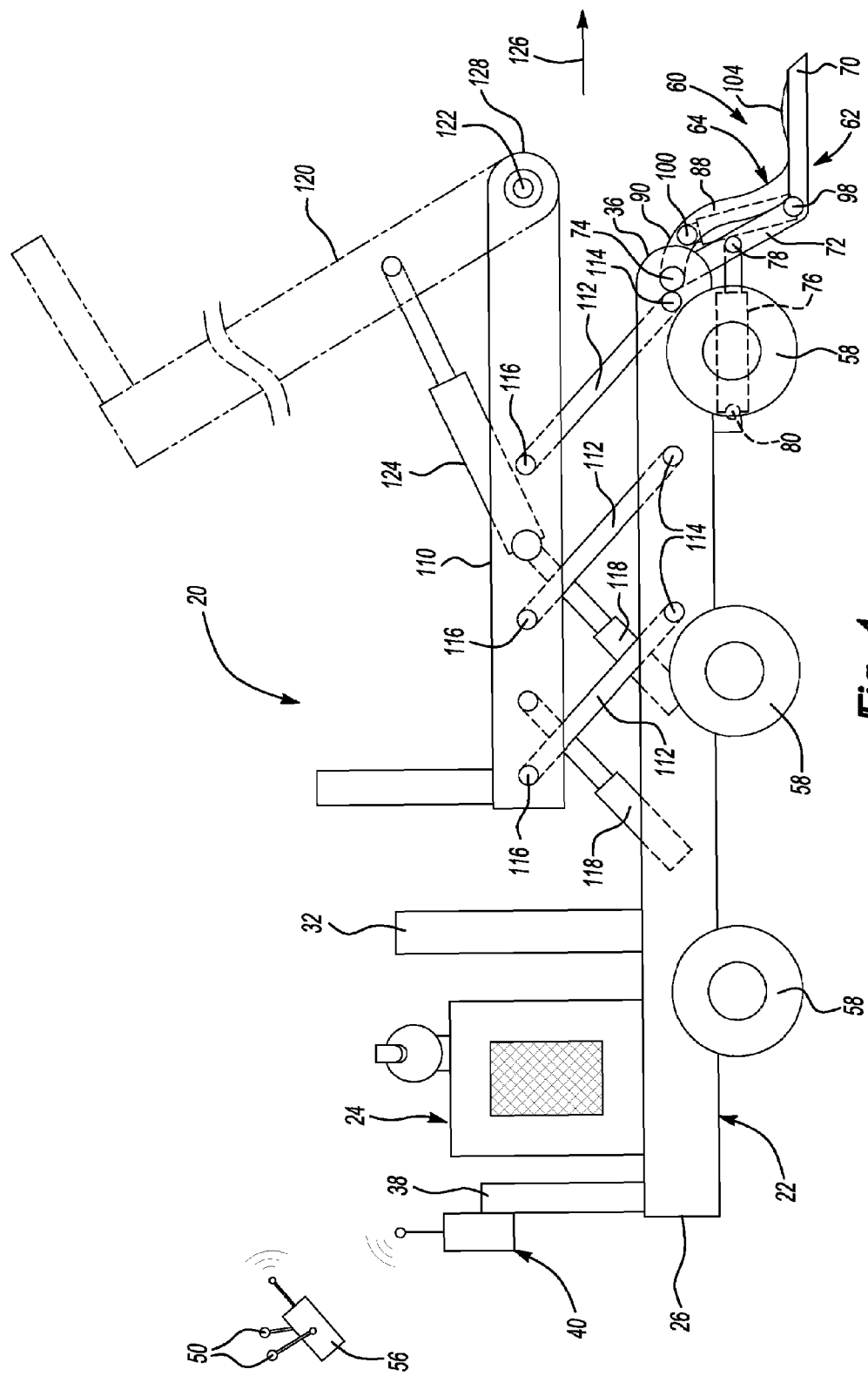
FIG. 4 is an additional embodiment of the present invention illustrating the utility vehicle of the present invention with a liftable and pivotable dump platform or bed, further illustrating a multi-wheel propulsion system wherein one or all of the wheels provide a drive force.

It is contemplated that the utility vehicle 20 be operated in the various modes, including: a walk behind mode in which the operator walks behind the utility vehicle 20 and manipulates the control handles 50 of the control mechanism 40 to drive and steer the utility vehicle 20; and a remote mode where the utility vehicle 20 is operated remotely using a separate remote unit 52 directly connected to the utility vehicle 20 using a cable 54 extending from the remote unit 52 to the control mechanism 40 of the utility vehicle 20 (see FIG. 5), or by using via RF or IF signals sent from a remote unit 56 to the control mechanism 40 of the utility vehicle 20, (see FIG. 4). Other remote operation methods may also be used.

Figure 5:
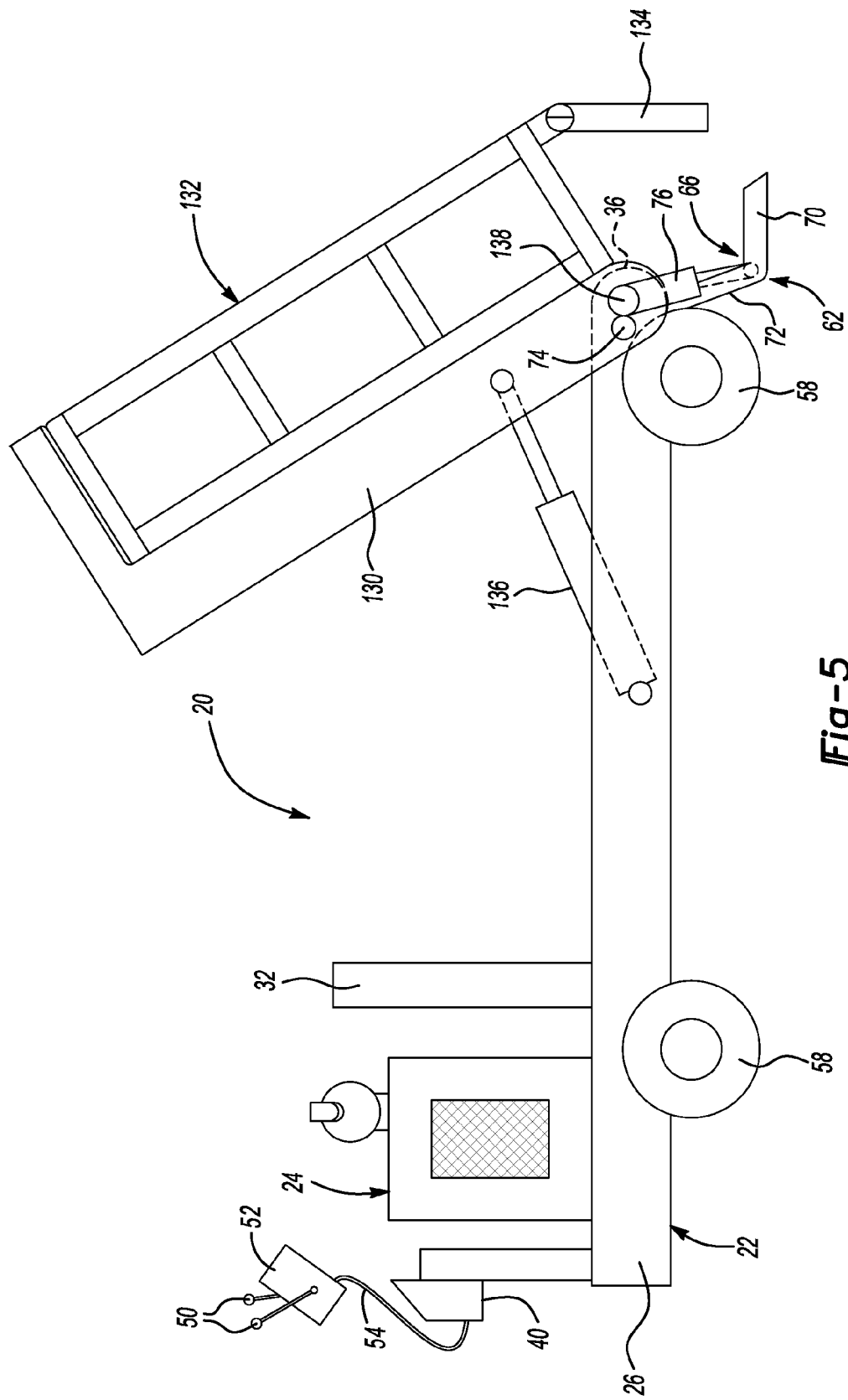
FIG. 5 is a side view of an additional embodiment of a utility vehicle according to the present invention including a dump bucket.

As shown in FIGS. 4-5, the track-type drive system may be replaced with or by wheels 58. The wheels 58 being of a size and design that minimizes any damage to the ground or other surface upon which the utility vehicle 20 is operated. Further while shown in FIG. 4 with three wheels 58 on each side of the utility vehicle 20, as shown in FIG. 5, a lesser number of wheels 58 can also be used. In addition, a greater number of wheels 58 may also be used to distribute the load or weight of the utility vehicle 20 over a wide footprint and thus reduce potential damage to the ground surface. Again, known drivetrains and drive systems can be used to steer and propel the utility vehicle 20.

The size or overall construction of the utility vehicle 20 is such that it can be driven and maneuvered in areas unsuitable for larger vehicles. For instance, in and on the front and back yards of homes, around bushes, trees and other landscaping. It is of a size and width suitable to pass through a standard size fence gate, which is typically 36 inches wide. It should be understood that depending upon the terrain upon which it is operated, it may be desirable to use soft, balloon type lawn tires, like those commonly used on many mowing machines or lawn tractors to reduce any damage to lawns or landscaping. Accordingly, such a utility vehicle 20 may be driven onto a lawn, used to pick up and haul away brush, debris, tree limbs from tree trimming operations, or other landscaping uses, all of which are typically labor intensive operations.

Figure 2:
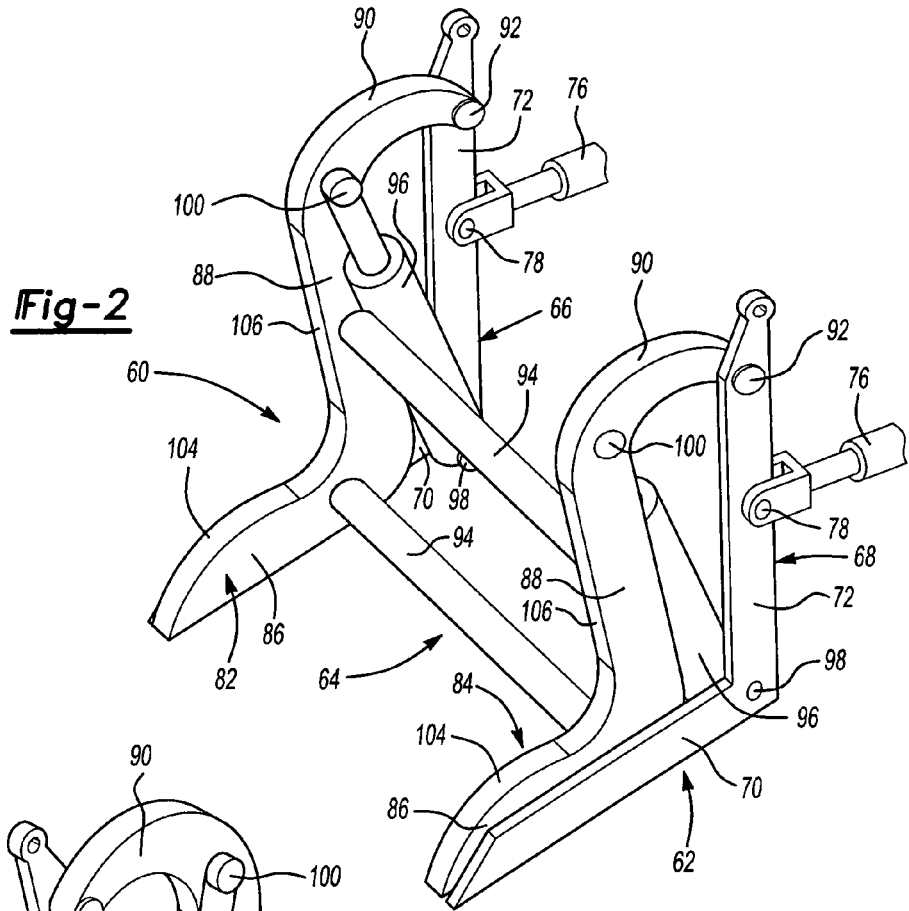
FIG. 2 is a front perspective view of the loading apparatus of FIG. 1 with portions removed for clarity.
Figure 3:
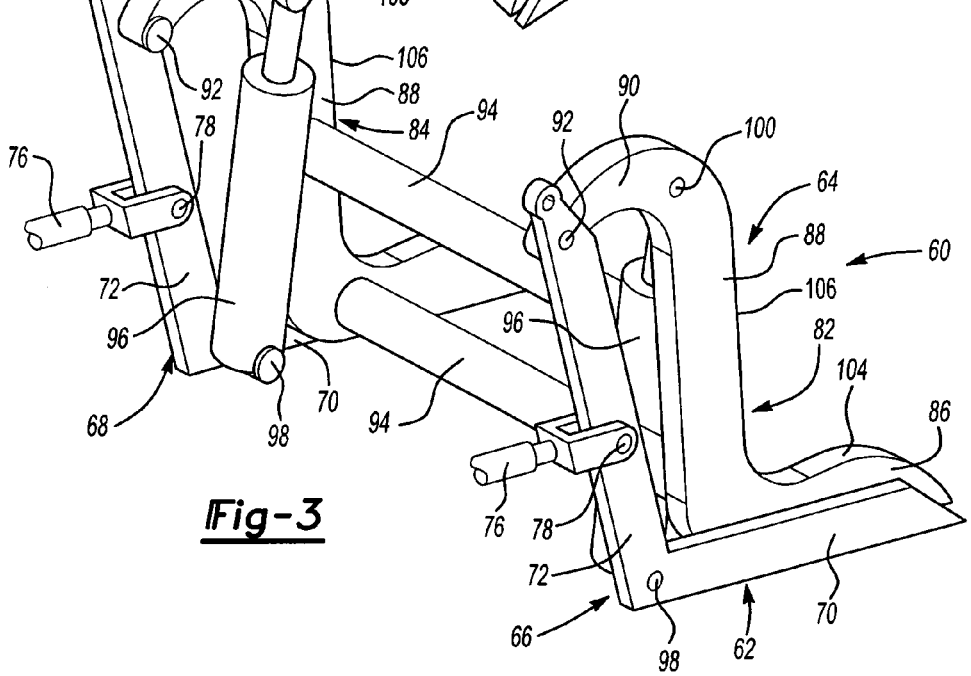
FIG. 3 is a rear perspective view of the loading apparatus of FIG. 1 with portions removed for clarity.

FIGS. 1-3 illustrate a loading apparatus or system, seen generally at 60, for use with the utility vehicle 20. The loading apparatus 60 includes a foot assembly 62 and in some instance may include a fork assembly 64. The foot assembly 62 includes first and second foot members 66, 68. Each foot members 66, 68 having a base portion or ground engaging member 70 and a leg portion 72. Each of the first and second foot members 66, 68 are pivotally secured, through pivot pins or stub shafts 74 on opposite sides of the front end 36 of the vehicle frame 22. It should be understood that the loading apparatus or assembly 60 is removably attached to the utility vehicle 20. Thus, depending on the particular use of the utility vehicle 20, the loading apparatus or assembly 60 can be removed from the utility vehicle. In addition, various components of the loading apparatus 60 may also be removed, for instance, the fork assembly 64 may be removed while the foot assembly 62 is left on the utility vehicle 20 to provide support during loading, unloading or moving of the platform or bed 30.

Power cylinders, such as hydraulic cylinders 76, are pivotally attached on one end thereof, via a pivot pin 78, to the leg portions 72 and on the opposite end thereof, via a pivot pin 80, to the vehicle frame 22. As used herein, power cylinders means any type of power source, including ball-screws, air cylinders or other actuation mechanisms used to generate movement between two or more components. The hydraulic cylinders 76 are used to lower and position the first and second foot members 66, 68 such that the respective base portions 70 engage and provide a base or support on the ground surface. The first and second foot members 66, 68 are shown herein as independently driven. This allows for the foot assembly 62 to compensate for uneven ground surfaces. It is, however, within the scope of the invention to provide a crossbar or other type of connecting member between the first and second foot members 66, 68 and use a single power source such as a hydraulic cylinder to move the respective base portions 70 of the foot assembly 62 in unison. Irrespective of the drive assembly used, the foot assembly 62 is connected to the utility vehicle 24 for movement between a transport position, i.e., a raised position and a working position, i.e., a lowered position wherein the base portions 70 of the foot members 66, 68 contact the ground surface.

The fork assembly 64 includes first and second fork members 82, 84. The first and second fork members 82, 84 each include a load engaging or lifting portion 86 and a leg portion 88. The respective leg portions 88 include a rearwardly extending arm portion 90. The end of the arm portion 90 receives a pivot pin 92 and is correspondingly pivotally secured to the upper end of the leg portion 72 of the first and second foot members 66, 68. Accordingly, the first and second fork members 82, 84 pivot with respect to the first and second foot members 66, 68. In the preferred embodiment, the arm portions 90 of each of the first and second fork members 82, 84, have a degree of curvature or an arcuate shape. The arm portions 90 may also be substantially straight. Cross members 94 extend between the respective first and second fork members 66, 68. The cross members 94 tie the respective first and second fork members 82, 84 together such that they move in unison. It is also contemplated that the cross members 94 may be removed whereby first and second fork members 82, 84 may move independently of one another.

To pivot the first and second fork members 82, 84 about the pivot pin 92 suitable power sources, such as hydraulic cylinders 96, are pivotally attached on one end, via a pivot pin 98 to first and second foot members 66, 68 and at the opposite end, via a pivot pin 100, to the first and second fork members 82, 84. As shown, the pivot pin 100 used to connect the hydraulic cylinders 96 to the first and second fork members 82, 84 is located at the intersection between the leg portion 88 and the arm portion 90. The arm portion 90 functions as a moment arm in relation to the distance between the pivot pin 100 and the pivot pin 92 used to secure the first and second fork members 82, 84 to the respective first and second foot members 66, 68.

As indicated, the fork assembly 64 is independent of the foot assembly 62. It should be understood, however, that securing one end of the hydraulic cylinders 96 used to move the fork assembly 64 to the foot assembly 62 transfers a load placed on the first and second fork members 82, 84 to the base portions 70 of the first and second foot members 66, 68, rather than the vehicle frame 22. While shown in the preferred embodiment with a set length, the base portion 70 of the foot members 66, 68 can be extended in length to provide additional support. Also, the base portion 70 may include a wide surface or pad that engages the ground surface. In addition, rather than providing each foot member 66, 68 with a base portion 70, the base portion could be a single slab having a ground engaging surface extending between the foot members 66, 68. In addition, while shown as a one-piece member, the foot members 66 may be formed in two or more pieces wherein the base member 70 folds up against the leg member 72 when not in use, and locks in the position shown during use. In this way, the utility vehicle 20 can lift a load greater than the overall weight of the utility vehicle 20, as the load is being lifted against or transferred to the base portions 70 which are placed on the ground during a lift and load operation.

As shown in FIG. 1, the base portions 70 of the first and second foot members 66, 68 remain on the ground surface while the hydraulic cylinders 96 operate to swing or rotate the first and second fork members 82, 84 about the pivot pins or stub shafts 92 in the arc shown by arcuate line 102. The lifting portion 86 of the first and second fork members 82, 84 may include a raised or convex surface 104 that functions to keep workpieces loaded on the lifting portion 86. In addition, the leading edge or surface 106 of the leg portion 88 may also have a degree of curvature to facilitate transfer of a workpiece from the first and second fork members 82, 84 to the utility vehicle 20. Accordingly, the first and second fork members 84, 86 function to correspondingly lift and deposit a workpiece on the platform or bed 30 of the utility vehicle 20.

During transport, the loading apparatus 60 is raised, i.e., the foot assembly 62 and correspondingly the fork assembly 64 is lifted by the hydraulic cylinders 76 such that the respective base portions 70 of the first and second foot members 66, 68 are lifted up off of the ground surface whereby the utility vehicle 20 may be driven to a particular location. When the utility vehicle 20 reaches its intended location, the loading apparatus 60 is lowered until the base portions 70 of the first and second foot members 66, 68 contact the ground surface. The first and second fork members 82, 84 are then loaded with workpieces, after which they are raised to deposit the workpieces on the bed 30 of the utility vehicle 20. As used herein, workpiece is broadly considered to encompass any article that can be lifted, carried or transported by the utility vehicle 20.

It should be understood that the loading apparatus 60 of may be operated by suitable controls situated on the control mechanism 40 located on the utility vehicle 20 or remotely by a hand-held unit 52, 56 using suitable transmission technology for relaying an operation signal from the hand-held unit 52, 56 to the control mechanism 40 located on the utility vehicle 20. In addition, the utility vehicle 20 may be driven much like a forklift truck, specifically, it may be driven or operated in any manner that places the loading apparatus 60 underneath a workpiece which is then lifted by the first and second fork members 82, 84 onto the platform or bed 30 of the utility vehicle 20.

Turning now to FIG. 4, a utility vehicle 20 is shown according to the present invention, including a liftable platform or bed 110 and a loading apparatus 60. As shown, a plurality of parallel link bars 112 are pivotally attached on one end thereof, via pivot pins 114, to the vehicle frame 22. The parallel link bars 112 are pivotally attached on the opposite end thereof, and via pivot pins 116, to the platform or bed 110 is attached to the vehicle frame 22 of parallel link bars 112. A plurality of power sources, such as hydraulic cylinders 118, are attached to and operative to drive the platform or bed 110 upward while it is supported on the link bars 118. Other types of power sources, including ball-screws, air cylinders or other actuation mechanisms may be used to raise the platform or bed 110 upwardly from the vehicle frame 22.

The parallel link bars 112, in addition to raising the platform or bed 110, also cause the platform or bed 110 to move in a rearward direction with respect to the vehicle frame 22, whereby the front end 128 of the platform or bed 110 extends outward past the front end 36 of the vehicle frame 22 in the direction shown by the arrow 126. This provides an added advantage when removing workpieces from the utility vehicle 20 in that there is a greater amount of room at the forward end 36 of the utility vehicle 20 to dump or deposit workpieces carried by the utility vehicle 20. In addition, such an arrangement allows the utility vehicle 20 to be positioned adjacent a cart, wagon or dumpster or some other container, whereby workpieces located on the bed or platform 110 may be raised to a height above and then transferred to the container.

In addition, such an arrangement enables the utility vehicle 20 to be placed adjacent a truck or other type of vehicle having a dump box or platform at a position or level higher than the initial or load carrying position of the platform or bed 110 of the utility vehicle 20 whereby the workpieces may be loaded onto the truck for removal and/or disposal. As shown, the loading apparatus 60 engages the ground surface to provide additional support at the front end 36 of the utility vehicle 20 during the dumping operation.

In addition, the platform or bed 110 may include a dump portion 120 which is pivotally attached, via a pivot pin 122 at one end thereof to the platform or bed 110. A second power source, typically a hydraulic cylinder 124, is operative to lift or raise the dump portion 120 of the platform or bed 110 to dump or empty workpieces from the platform or bed 110.

In a further embodiment, the dump portion 120 of the platform or bed 110 is pivotally attached to the front end 36 of the utility vehicle 20 without the need for the plurality of parallel link bars 112. In such an instance, the hydraulic cylinder 124 operates to pivot the platform or bed 110. While shown in FIG. 4 including an entire loading apparatus 60, the utility vehicle may simply include only the foot assembly 62 of the loading apparatus 60, which as set forth above, provides support at the front end 36 of the utility vehicle 20 during the lifting and dumping operation of the utility vehicle 20.

As discussed earlier, FIG. 4 shows the utility vehicle 20 with wheels 58 rather than the track type drive system as shown in FIG. 1. This type of drive arrangement may use lawn or turf type tires that typically cause less damage to the ground surface. Additionally, the number or sets of wheels 58 may vary depending upon the type of surface upon which the utility vehicle 20 is to be operated. FIG. 5 illustrates the utility vehicle 20 with two wheels 58 on each side of the utility vehicle 20 for a total of four wheels, two on each side. The wheels 58 may be independently mounted to the vehicle frame 22 or may be mounted in pairs on respective axles. The propulsion system 28 associated with the wheels 58 may drive all or one of the wheels 58 depending upon the particular needs of the utility vehicle 20. In some cases, it may be advantageous to make the utility vehicle 20 an all-wheel drive vehicle. Power transmission systems capable of such a drivetrain are known in the art.

FIG. 5 illustrates a further embodiment of the utility vehicle 20 including a pivotable platform or bed 130 having a dump box 132 secured thereto. The dump box 132 includes a pivotable gate 134, which opens when the dump box 132 is raised to allow workpieces or other material to exit the dump box 132. As shown in FIG. 5, the dump box 132 can be raised about its pivot axis by a suitable power source such as a hydraulic cylinder 136. The utility vehicle 20 may include the entire loading apparatus 60 or may simply include only the foot assembly 62 of the loading apparatus 60, which as set forth above, provides support at the front end 36 of the utility vehicle 20 during the lifting and dumping operation of the utility vehicle 20. As shown in FIG. 5, the hydraulic cylinder 76 that drives the foot member 66 is attached at one end, via a pivot point 138, to the first end 36 of the utility vehicle 20. The hydraulic cylinder 76 is attached at the other end to the base portion 70 of the foot member 66. This is an alternative arrangement for mounting the foot member 66.

Figure 6:
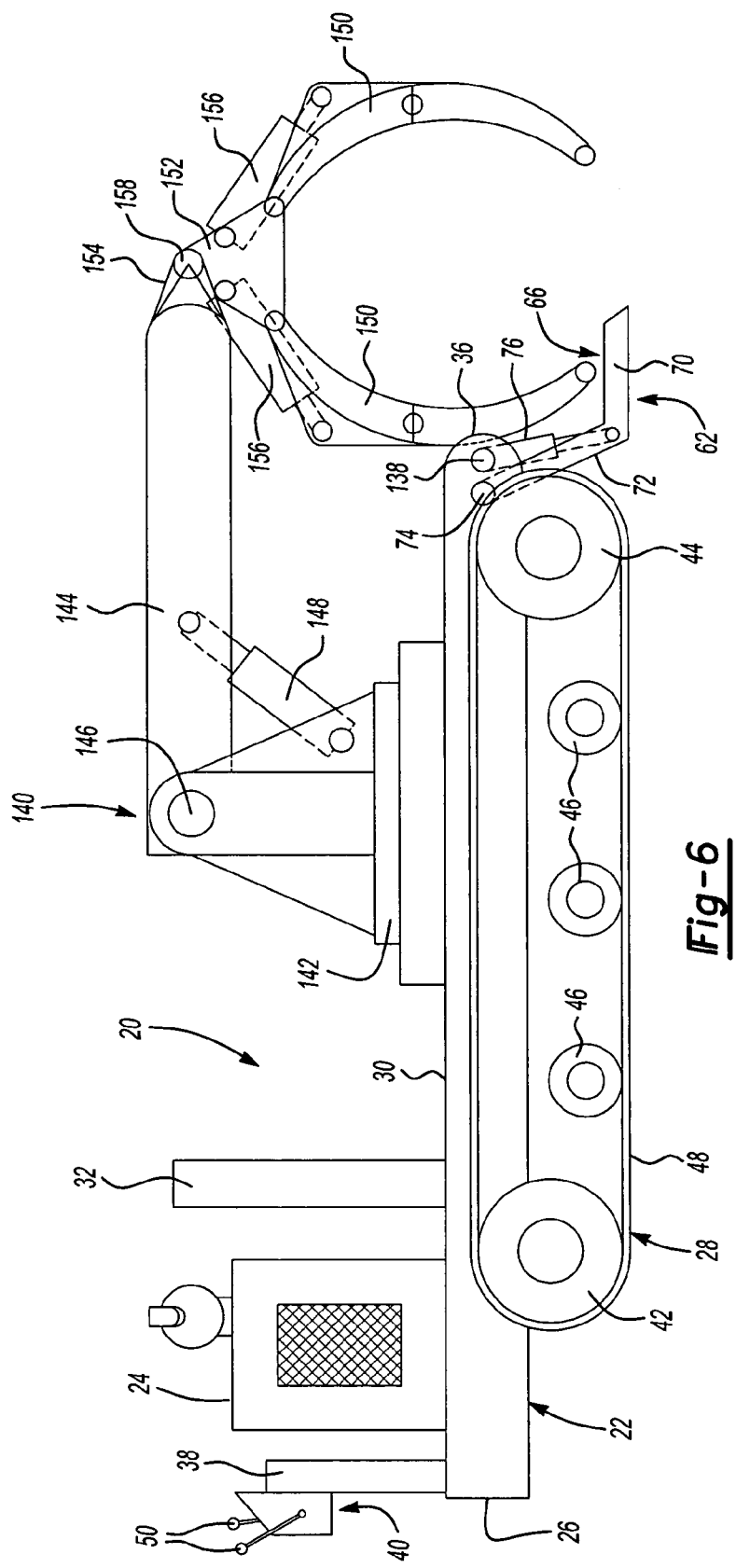
FIG. 6 is a side view of an alternative embodiment of the utility vehicle according to the present invention including a claw-type loader secured to the platform or bed of the utility vehicle.

Turning to FIG. 6, a utility vehicle 20 according to a further embodiment is illustrated having a track-type drive or propulsion system similar to that shown in FIG. 1. The utility vehicle 20, having a grapple or claw-type loading apparatus 140 for grasping, lifting, moving and loading a workpiece from one position to another. The grapple assembly 140 includes a rotatable base portion 142 secured to the platform or bed 30 of the utility vehicle 20. An arm member 144 is pivotally connected to the base portion 142 by a pivot pin 146. A hydraulic cylinder 148 is connected between the base portion 142 and the arm member 144 and is operative to pivot the arm member 144 about the pivot pin 146. The arm member 144 may include a telescopic portion whereby it extends in length. Claw-type fingers of 150 are pivotally attached to a support member 152. Hydraulic cylinders 156 are attached on one end to the support member 152 and on their respective opposite ends to the claw-type fingers 150. Actuation of the cylinders 156 causes the claw-type fingers 150 to open and close to grasp a workpiece. The support member 152 is pivotally attached to the end 154 of the arm 144 via a pivot pin 158.

As with the previous embodiments, The utility vehicle 20 may include the entire loading apparatus 60 or may simply include only the foot assembly 62 of the loading apparatus 60, which as set forth above, provides support at the front end 36 of the utility vehicle 20 during operation of the grapple or claw-type loading apparatus 140.

Figure 7:
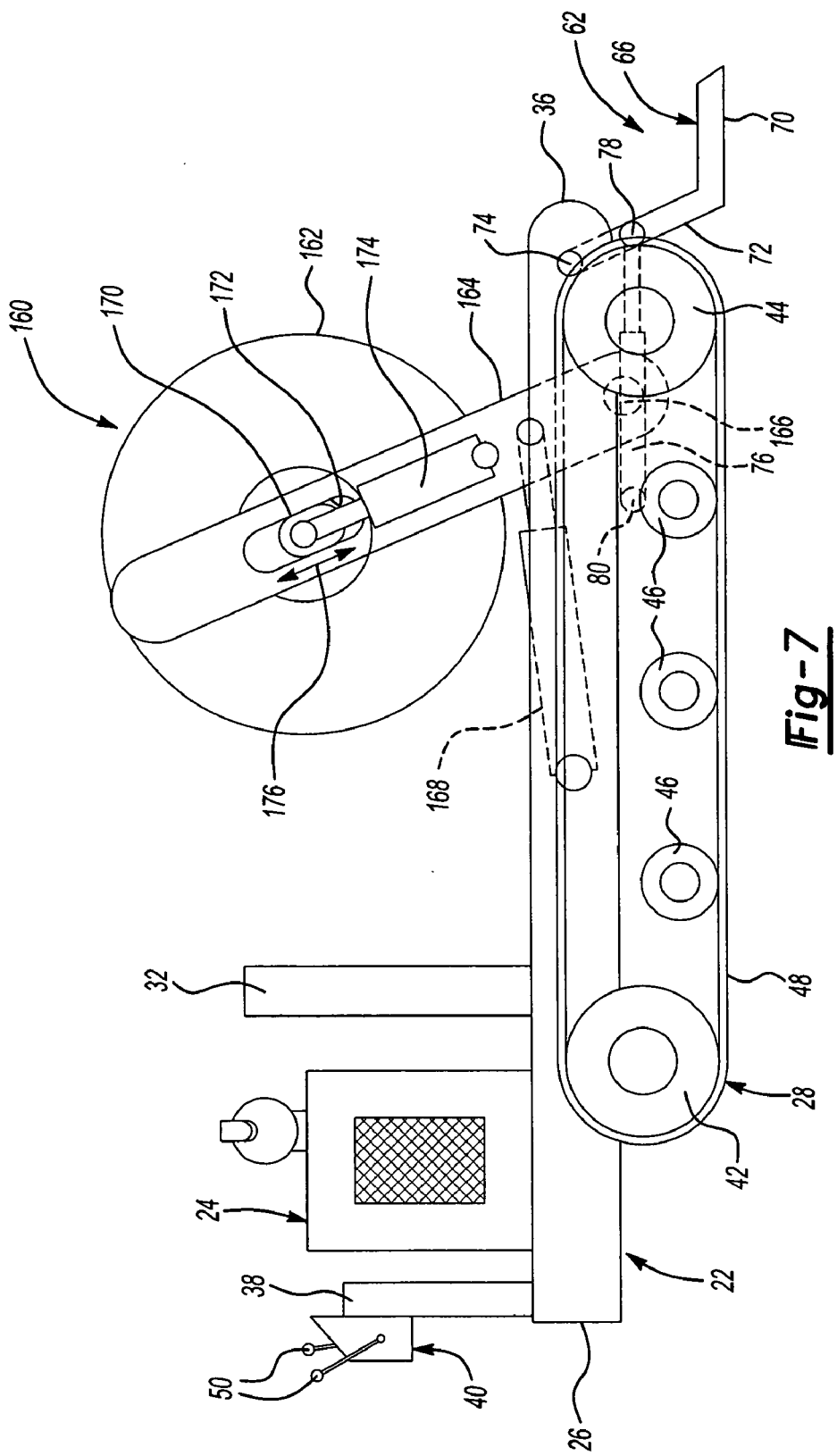
FIG. 7 is a side view of an alternate embodiment of a utility vehicle according to the present invention including an apparatus for lifting and carrying cable or other types of coiled product.

FIG. 7 illustrates a utility vehicle 20 having a track-type drive system similar to that shown in FIG. 1 including a reel loader assembly 160 of the type used to lift and transport reels 162, typically containing a recoilable product such as cable, hose, or wire. The reel loader assembly 160 includes at least one arm member 164 pivotally attached to the vehicle frame 22, and may include a pair of arm members. The arm 164 pivots or moves about the pivot point 166 due to operation of a hydraulic cylinder 168. A reel support member 170 is slidably mounted within a groove or slot 172 located in the arm member 164. A power source, such as a hydraulic cylinder 174, is connected to the reel support member 170 and is operative to move the reel support member 170 longitudinally in the direction shown by the arrow 176 to accommodate different size reels 162. It should be understood that smaller reels 162 may then be lifted and supported on the utility vehicle 20 while keeping their center axis as close as possible to the pivot point 166 of the arm member 164 to reduce the necessary lifting force and moment.

Figure 8:
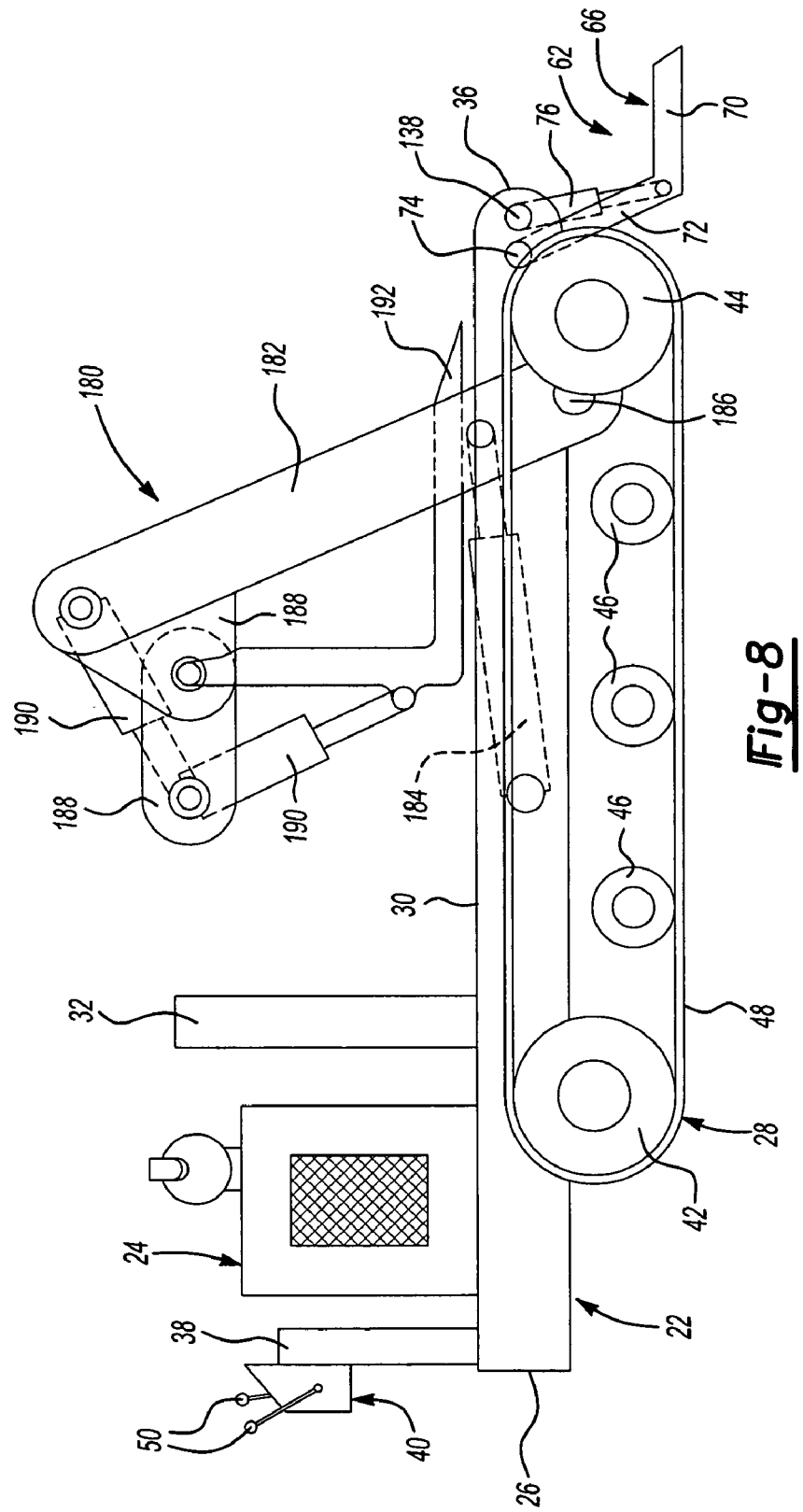
FIG. 8 is a side view of an alternative embodiment of a utility vehicle according to the present invention including a fork/pallet type lifting apparatus suitable for lifting, carrying and unloading materials, typically those types of materials stored on a conventional pallet.

With the present embodiment, the utility vehicle 20 typically includes only the foot assembly 62 of the loading apparatus 60, which provides support at the front end 36 of the utility vehicle 20 during loading of the reel 162. Thus, the cylinder 76 is used to raise and lower the foot assembly 62. FIG. 8 illustrates the same mounting arrangement of the hydraulic cylinder 76 that repositions the foot member 66, as shown in FIG. 1.

FIG. 8 illustrates a utility vehicle 20 having a track-type drive or propulsion system similar to that shown in FIG. 1, having a fork lift/carrier 180 secured to the frame 22 of the utility vehicle 20. The utility vehicle 20 further includes a foot assembly 62 that engages the ground surface to support the load during operation of the fork lift/carrier assembly 180. As with the foot assemblies 62 shown in FIG. 5-6, the foot assembly 62 differs slightly from the previous embodiments in that the hydraulic cylinder 76 is mounted to the front end 36 of the frame 22 in front of the pivot pin 74 about which the foot member 66 pivots.

An arm member 182 of the fork lift/carrier assembly 180 is pivotally attached to the frame 22 by a pivot pin 186. A hydraulic cylinder 184 operates to move or pivot the arm member 182 toward the front end 36 of the utility vehicle 22. A plurality of link members 188 and hydraulic cylinders 190 operate to position the fork member 192 and enable it to be lowered to the ground surface and to lift and carry a workpiece, typically a pallet having a load attached thereto. Thus, the fork lift/carrier 180 lifts a pallet from the ground surface onto the utility vehicle 20 where it can be transported to a new location. Further, such assembly can be used to lift and carry pallets from a truck or trailer to a remote or difficult to access location.

Figure 9:
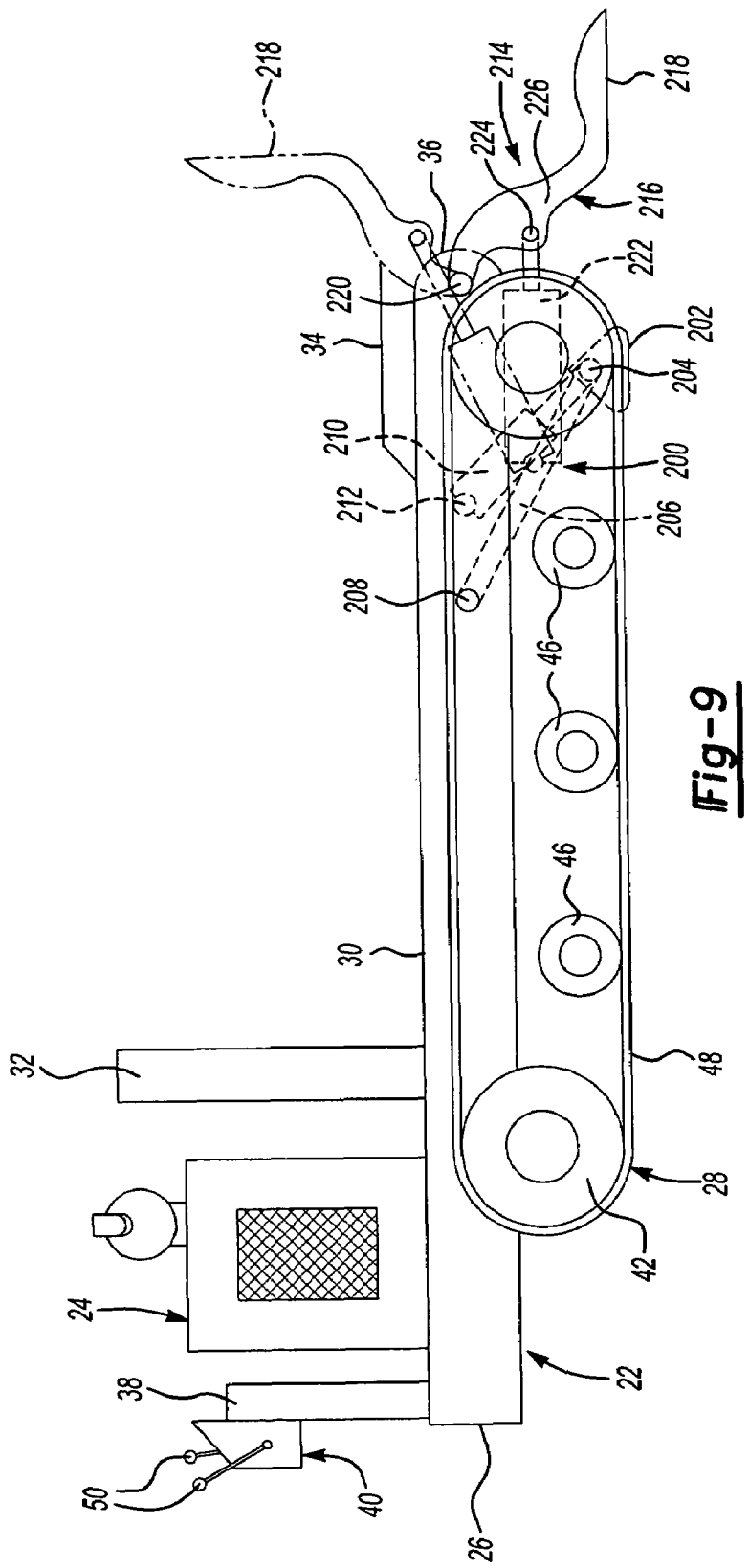
FIG. 9 is a side view of an alternate embodiment of the utility vehicle according to the present invention including a foot assembly and fork assembly.

FIG. 9 illustrates an alternate embodiment of a utility vehicle 20 according to the present invention. The utility vehicle 20 utilizes a track-type drive unit or propulsion system 28 similar to that shown in FIG. 1. It may also utilize a plurality of tires or wheels as shown in FIG. 4-5, depending upon the drive arrangement desired. As shown in FIG. 9, the utility vehicle 20 includes a further embodiment of a foot assembly 200 including a foot member or pad 202 pivotally attached, via a pivot pin 204, to a link member 206. The link member 206 is pivotally connected, via a pivot pin 208, to the frame 22 of the utility vehicle 20. A hydraulic cylinder 210 is connected both to the foot member 202 at pivot pin 204 and the frame member 22 via a pivot pin 212. The hydraulic cylinder 210 or other power source is operative to lower the foot member 202 until it contacts the ground surface whereby it provides support for the vehicle frame 22. In the disclosed embodiment, the foot member 202, corresponding hydraulic cylinder 210 and link member 206 are mounted to the vehicle frame 22 between the tracks 34 of the track-type drive or propulsion system 28. Accordingly, the foot assembly 200 provides support for the utility vehicle 20 during use of the vehicle, particularly when the utility vehicle 20 includes many of the implements set forth previously. Thus, at least a portion of the utility vehicle 20 is supported by the foot member 202 rather than the components of the drive system or propulsion unit 28. It should be understood that the length of the link member 206 can be extended such that the foot member 202 is disposed adjacent or past the front end 36 of the vehicle 20.

FIG. 9 also discloses a further embodiment of a utility vehicle 20 according to the present invention including a loading apparatus or system, seen generally at 214. The loading apparatus or system 214 includes a fork assembly 216. The loading apparatus 214 can be used in connection with the foot assembly 200. The fork assembly 216 includes at least one fork member 218 pivotally attached, via a pivot pin 220, to the vehicle frame 22 and a hydraulic cylinder 222. The hydraulic cylinder 222 is pivotally attached on one end thereof, via a pivot pin 224, to the leg portion 226 of the fork member 218. The other end thereof connected to the vehicle frame 22 whereby actuation of the hydraulic cylinder 222 raises and lowers the fork assembly 216.

Accordingly, at least some of the weight or loading force; i.e., the force generated when a load placed on the fork member 218 is lifted from the ground surface onto the utility vehicle 20, is borne by transferred to the foot member 202. As set forth previously, this arrangement enables a workpiece to be lifted by the fork assembly 216 onto the utility vehicle 20, whereby at least a portion of the weight thereof is borne by the foot member 202 and correspondingly the ground surface.

It should be understood that part of the invention is the use of a loading apparatus 60 having a foot assembly 62 and a fork assembly 64 wherein at least a portion of the weight or load distribution is borne by the foot assembly 62 rather than the utility vehicle 20 when the fork assembly 64 is used to lift and deposit a load on the utility vehicle 20. Further, at least a portion of the weight or load is also borne by the foot assembly and correspondingly the ground surface when using other implements, including a dump box or raisable bed as disclosed in the previous embodiments. Such an arrangement enables the utility vehicle 20 to be of a light weight and easily maneuverable construction and versatile in that it is suitable to support a variety of implements.

The present invention discloses the use of hydraulics, including hydraulic motors as a power source. Other power sources such as ball screws, screw jacks and similar power sources may be used to move and reposition the various components, including the loading apparatus 60 of the utility vehicle 20.

The description of the invention is merely exemplary in nature and, thus, variations that do not depart from the gist of the invention are intended to be within the scope of the invention. Such variations are not to be regarded as a departure from the spirit and scope of the invention

What is claimed is:

1. A utility vehicle comprising:
  a vehicle frame, including a bed;
  a propulsion system, said propulsion system attached to said vehicle frame for moving said vehicle frame in response to an input from a control mechanism;
  a loading apparatus, said loading apparatus mounted on said vehicle frame, said loading apparatus including a foot assembly and a fork assembly, said foot assembly movable to a working position wherein a portion of said foot assembly contacts the ground;
  said fork assembly operative to move between a first, lowered position and a second, raised position when said foot assembly is in said working position wherein as said fork assembly moves between said first, lowered position and said second, raised position, said fork assembly lifts a workpiece located on said fork assembly and deposits the workpiece on the bed;
  said fork assembly includes a fork member including a lifting portion, a leg portion, and an arm portion;
  said foot assembly includes a foot member, said foot member including a base portion and a leg portion, said leg portion connected to said vehicle frame;
  said arm portion connected to said foot assembly; and
  a power cylinder connected at one end thereof directly to said fork member and on an opposite end thereof directly to said foot assembly whereby said fork member moves separately from said foot assembly.

2. A utility vehicle as set forth in claim 1 wherein said fork assembly is pivotally attached to said foot assembly and moves independently of said foot assembly.

3. A utility vehicle as set forth in claim 1 wherein said utility vehicle has front and rear ends, said loading apparatus mounted adjacent to said front end and a motor forming a part of said propulsion system, said motor mounted to said vehicle frame near said rear end.

4. A utility vehicle as set forth in claim 1 wherein said propulsion system includes a drive wheel rotatably supported on said vehicle frame, a take up wheel rotatably supported on said vehicle frame and an endless belt disposed over said drive wheel and said take up wheel whereby rotation of said drive wheel causes movement of said endless belt to propel the utility vehicle.

5. A utility vehicle comprising:
  a vehicle frame, including a bed;
  a propulsion system, said propulsion system attached to said vehicle frame for moving said vehicle frame in response to an input from a control mechanism;
  a loading apparatus, said loading apparatus mounted on said vehicle frame, said loading apparatus including a foot assembly and a fork assembly, said foot assembly movable to a working position wherein a portion of said foot assembly contacts the ground;
  said fork assembly operative to move between a first, lowered position and a second, raised position when said foot assembly is in said working position wherein as said fork assembly moves between said first, lowered position and said second, raised position, said fork assembly lifts a workpiece located on said fork assembly and deposits the workpiece on the bed;
  said fork assembly includes first and second fork members, each of said fork members attached to said foot assembly;
  a cross member extending between said first and second fork members and connecting said first and second fork members to one another; and
  a power cylinder, said power cylinder directly engaging and directly extending between said foot assembly and said fork assembly, said power cylinder operative to move said fork assembly independent of said foot assembly.

6. A utility vehicle comprising:
  a vehicle frame, said vehicle frame having a front end and a rear end;
  a platform formed on an upper surface of said vehicle frame;
  a power source located on said vehicle frame near said rear end;
  a propulsion system attached to said vehicle frame for moving said vehicle frame in response to an input from a control mechanism, said propulsion system connected to and receiving power from said power source;
  a loading apparatus, said loading apparatus including a foot assembly and a fork assembly, said foot assembly connected to said vehicle frame and including first and second foot members, each of said foot members including a base portion and a leg portion, said fork assembly including first and second fork members each of said fork members including a lifting portion, a leg portion and an arm portion, said fork assembly mounted to said foot assembly for movement independent of said foot assembly wherein in at least one position said lifting portion of said fork assembly is positioned adjacent said base portion of said foot assembly; and a power cylinder connected directly between said fork assembly and said foot assembly, said power cylinder operative to move said fork assembly independent of said foot assembly.

7. A utility vehicle as set forth in claim 6 wherein said control mechanism includes a remote unit, said remote unit receiving input from an operator and transferring said input to said control mechanism for controlling said propulsion system, foot assembly and fork assembly.

8. A utility vehicle as set forth in claim 6 wherein said propulsion system includes a drive wheel, a take up wheel, and an endless belt disposed about said drive wheel and said take up wheel.

9. A utility vehicle as set forth in claim 6 wherein said propulsion system includes a plurality of wheels mounted to said vehicle frame, said wheels receiving a driving input from said power source.

10. A utility vehicle as set forth in claim 6 including a mechanism for raising said platform upwards, off of said vehicle frame, said mechanism further moving said platform rearward such that it extends past said rear end of said vehicle frame.

11. A utility vehicle as set forth in claim 10 wherein said mechanism for raising said platform and moving said platform rearward includes a plurality of parallel link bars connected on one end thereof to said vehicle frame and on an opposite end thereof to said platform; and a power cylinder connected to said vehicle frame and said platform, said power cylinder operative to raise said platform on said plurality of parallel link bars.

12. A utility vehicle comprising:

a vehicle frame, said vehicle frame having a front end and a rear end;

a platform located on an upper surface of said vehicle frame;

a power source located on said vehicle frame near said rear end;

a propulsion system attached to said vehicle frame for moving said vehicle in response to an input from a control mechanism, said propulsion system connected to and receiving power from said power source;

a foot assembly, said foot assembly connected to said vehicle frame and including first and second foot members, each of said foot members including a base portion and a leg portion;

a power cylinder directly connected to and extending between said foot assembly and said vehicle frame, said power cylinder operative to move said foot assembly between a raised position and a lowered position wherein said base portion contacts the ground surface; and an implement supported on said platform.

13. A utility vehicle as set forth in claim 12 including said foot assembly mounted at a mounting point to said vehicle frame near said front end of said vehicle frame, said power cylinder operative to move said foot assembly connected between a foot member of said foot assembly and said vehicle frame at a location between the mounting point of said foot member and said front end of said vehicle.

14. A utility vehicle as set forth in claim 12 including said foot assembly mounted at a mounting point to said vehicle frame near said front end of said vehicle frame, said power cylinder operative to move said foot assembly connected between a foot member of said foot assembly and said vehicle frame at a location between the mounting point of said foot member and said rear end of said vehicle.

15. A utility vehicle as set forth in claim 12 wherein said implement includes a dump box pivotally attached to said platform; and a power cylinder connected between said vehicle frame and said dump box to raise said dump box.

16. A utility vehicle as set forth in claim 12 to wherein said implement includes a claw-type loading apparatus having a base portion rotatably mounted on said platform;

an arm pivotally connected to said base portion and extending outwardly therefrom;

a power cylinder extending between said base portion and said arm portion, said power cylinder operative to move said arm portion;

a pair of fingers, said fingers to pivotally attached to a support member, said support member secured to said arm portion; and a pair of power cylinders connected to said support member and said fingers, said power cylinders are operative to move said fingers whereby said fingers may grasp a workpiece.

17. A utility vehicle as set forth in claim 12 to wherein said implement includes a reel loader assembly, said reel loader assembly including an arm member pivotally attached to said vehicle frame, said arm member having an elongated opening located therein;

a reel support member connected to said arm member for movement within said elongated opening; and foot assembly pivotally mounted to said vehicle frame adjacent said front end of said vehicle frame, said power cylinder operative to move said foot assembly connected to a foot member of said foot assembly and to said vehicle frame between the mounting point of said foot member and said rear end of said vehicle.

18. A utility vehicle as set forth in claim 12 to wherein said implement includes a fork lift assembly, including an arm member pivotally attached to said vehicle frame;

a power cylinder connected to said arm member and said vehicle frame, said power cylinder operative to move said arm member;

a fork member connected to said arm member by at least one link member and pivot pin combination.

* * * * *